United States Patent [19]

Miura et al.

[11] 3,903,000

[45] Sept. 2, 1975

[54] SETTLER

[75] Inventors: Mitugi Miura, Osaka; Naosi Honda, Tokyo, both of Japan

[73] Assignee: Miura Engineering International Company Ltd., Osaka, Japan

[22] Filed: Dec. 18, 1973

[21] Appl. No.: 425,719

[30] Foreign Application Priority Data

Dec. 28, 1973    Japan.............................. 48-130169

[52] U.S. Cl. ................. 210/251; 210/19; 210/320; 210/522; 209/437; 209/446
[51] Int. Cl.² ......................................... B01D 21/00
[58] Field of Search ...... 209/368, 437, 446; 210/19, 210/521, 522, 251, DIG. 18, DIG. 19, DIG. 22, 294, 320, 388, 384, 319; 55/15, 277

[56] References Cited
UNITED STATES PATENTS

| | | |
|---|---|---|
| 2,119,013 | 5/1938 | Kerns et al.......................... 210/521 |
| 2,688,402 | 9/1954 | Butterworth.......................... 55/277 |
| 3,284,991 | 11/1966 | Ploeyer et al.......................... 55/277 |
| 3,325,007 | 6/1967 | Erlenstadt et al................... 209/368 |
| 3,529,728 | 9/1970 | Middelbeck et al................ 210/522 |

FOREIGN PATENTS OR APPLICATIONS 872,305    3/1953    Germany .............................. 55/277

*Primary Examiner*—Samih N. Zaharna
*Assistant Examiner*—F. F. Calvetti
*Attorney, Agent, or Firm*—Browdy and Neimark

[57]    ABSTRACT

An apparatus wherein purified water is discharged after separation of particle solid substances from the liquid at its upper part; while particle solid substance is discharged from the bottom of the device after being made to settle downwardly. More particularly, it relates to a compact settler which increases not only the efficiency of solid-liquid separation equipment but also the efficiency of settlement and of concentration equipment.

2 Claims, 5 Drawing Figures

3,903,000

SETTLER

SUMMARY OF THE INVENTION

This invention relates to an apparatus wherein purified water is discharged after separation of particle solid substance and liquid at its upper part; while particle solid substances is discharged from the bottom of the apparatus after being made to settle downwardly. More particularly, it relates to a compact settler which increases not only the efficiency of solid-liquid separation equipment but also the efficiency of settlement and of concentration equipment.

In the conventional apparatus for precipitation and concentration, the raw liquid is fed from the back side in the center and flows toward the edges radiating in all directions, particle solid substance being made to settle in the bottom and accumulate in the center for discharge from the exhaust pipe, liquid being made to rise and overflow from the upper edge. In brief, the two opposite operations, i.e. lowering and rising, work at the same time. In case the rising velocity of the liquid is rapid, settling of the solid substance becomes difficult. Therefore, it is determined that the rising velocity of the liquid has generally to be less than 1 m/m/sec. When the retention tims is as long as one to two hours, for instance, the apparatus such as 1000 T/H capacity to be as large as 50 meters in diameter.

For this reason, the method or apparatus of this type has such disadvantages as large floor space and expensive installation costs.

If the diameter of a conventional settler is designed to be smaller, the purpose of settlement and concentration can not be attained because the rising velocity of liquid is higher and fine particles of solid substance use without settling mixed with the rising liquid, though the retention time is shorter.

In the conventional device settled solid substance in the whole area of the bottom is quietly accumulated by the scrapers in the center of the bottom and discharged from the exhaust pipe therein.

At that time, in case the velocity of these scrapers is higher, a disadvantage appears that solid substance floats up again.

In case the velocity of liquid is higher, there is a disadvantage that once settled solid substance floats up by the side-stream of the raw liquid.

The object of the present invention is to remove the conventional defects and offer a settler which has the excellent following functions of separation and concentration.

1. The retention time is shorter.
2. The size of the settling tank is remarkably smaller.
3. Settled solid substance does not float up again effected by the stream of liquid.

Thus, in this invention, as a compact settler, the separation equipment is provided with inclined plates so as to allow raw liquid to be treated to flow in and to allow clarified liquid separated from the solid substances to discharge, and with partition plates, installed, crossing the direction of the inclined plates at the lower ends of the inclined plates in order to prevent agitation by the stream of the liquid and to concentrate solid substance settled between partition plates effectively. This invention inexpensively provides a compact more effective settler. Moreover, the embodiment of this invention shown avoids the rising and the turbulence of fine solid substance by the flow of liquid in conventional settlers, and makes it possible to achieve solid-liquid separation and concentration functions just as designed.

BRIEF DESCRIPTION OF THE DRAWINGS

The drawings show the examples of the present invention in which.

DETAILED DESCRIPTION OF THE PREFERRED EMBODIMENTS

Figure 1:
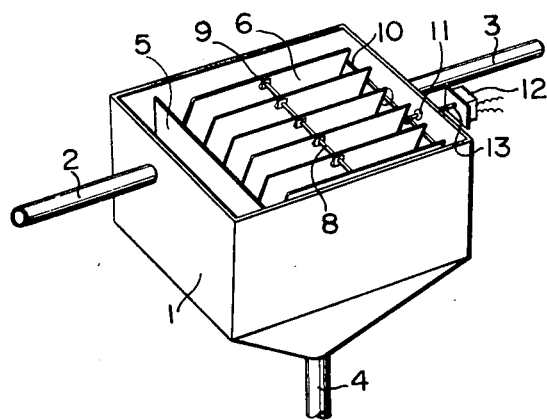
FIG. 1 is the projection view of the present invention illustrated by an example.

The primary object of the invention is that the structure of the invention answering the above-mentioned purposes allow liquid treated to flow straight between parallel inclined plates provided at the upper portion thereof and to separate particle solid substances from the liquid. At that time, only purified liquid is allowed to be discharged from the exhaust pipe, while particle solid substance, settled between the parallel partition plates crossing at the lower edges thereof, is allowed to be discharged from the outlet pipe under no influence of the feeding flow of liquid.

Another object of the invention is that in case particle solid substance settled on the inclined plates has the property of sticking to the inclined plates, such inclined plates are given vibration so that the function of separation between particle solid substance and liquid will not be reduced and further the partition plates at the lower portion thereof are also given vibration so that the function of concentration will not drop.

Referring now to the drawing, there is shown an inlet pipe 2 for raw liquid to be treated at one side of the separator 1, and an outlet pipe 3 for purified liquid at the other side thereof, and an exhaust pipe 4 for concentrated solid substance at the lower part thereof just like inverse hip roof. The exhaust pipe 4 may have a sluice valve or a screw shaft therewithin exhausting the solid.

An overflow or underflow plate 5 for unifying the flow of raw liquid to be treated is provided in the settler in front of the inlet pipe 2.

Inclined plates 6 for solidliquid separation, arranged at regular intervals and inclined at an angle, parallel to the direction of the inlet pipe 2 and the outlet pipe 3, i.e., the same direction of the liquid flow are provided between the plate 5 and the outlet pipe 3.

Partition plates 7 for the concentration of slurry are provided below the inclined plates, crossing the direction of aforesaid inclined plates 6 arrangement and provided vertically at regular intervals.

A stem 8 fastens the inclined plates 6 or partitions plates 7 each other into one body by the medium of a distance piece 9.

An arm 10 for vibration of said inclined plates 6 or partition plates 7 is connected with a rod 13 conducting properly to an electromagnetic vibration device 12 by means of a rubber seal 11 on the wall surface of the settler 1.

The inclined plates 6 and the partition plates 7 are separated by means of the contacting phase 14 and consequently each has a vibration system of its own or a vibration system fixed together in one body.

In the above-mentioned device, if raw liquid to be treated is fed into the settler 1 through the inlet pipe 2, the liquid will overflow, spread or underflow against the overflow or underflow plate 5 and flow straight in fixed quantity and between the inclined plates 6. During that time, solid substance settles on the inclined plates 6 under the influence of solidliquid separation and only the purified liquid of the upper flow is discharged through the exhaust pipe 3. The particle solid substance which has settled on the inclined plates 6 slides downward thereon and finally settles down between the partition plates 7. Each group of solid substance between the partition plates settles statically and stably and is concentrated finally, under no influence of the flow of the passing liquid in the thickener because said partition plates 7 are arranged across the direction of the alignment of the inclined plates 6. During this process, when the electromagnetic device 12 is operated, the rod 13 begins to vibrate, which causes the arm 10 which has unified the inclined plates 6 in one body to move laterally so that the inclined plates 6, tightly unified in one body as a medium of distance pieces 9, vibrate in the same direction as that of the vibration of the rod 13.

Thus, the settled particle solid substance on the inclined plates 6 slide downward without sticking and also the intervals between the inclined plates 6 are at all times kept uniform as designed, so that the function of solid-liquid separation will not be reduced.

Figure 2:
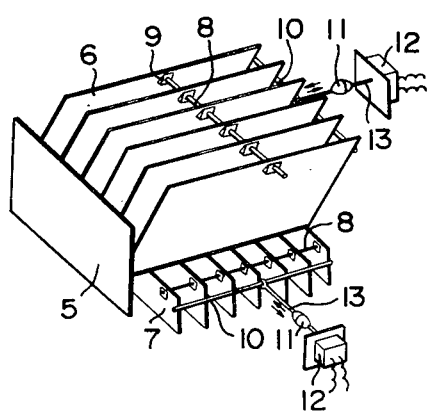
FIG. 2 is the projection view illustrated by another example.
Figure 3:
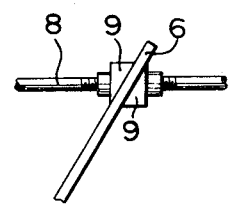
FIG. 3 is a drawing which shows how to fix the inclined plates firmly to a round bar.

The preferred embodiments of this invention are described below, which should be read in conjunction with the accompanying drawings in which:

FIG. 1 illustrates an example whereby the inclined plates are vibrated 6 only in the direction of the alignment thereof (lengthwise). FIG. 2 illustrates another example whereby the inclined plates 6 are vibrated parallel to the direction of the alignment thereof, and on the other hand, the partition plates 7 are vibrated parallel to the direction of the alignment thereof. When vibrating the partition plates 7, the slurry between the partition plates 7 is also vibrated gently at high frequency so that fine particle solid substance may be caused to settle.

There are three methods, below, of the direction of vibration in accordance with the property of the slurry in the liquid to be treated.

One method is to give vibration to the inclined plates 6 parallel to the direction of the alignment thereof so that the settled solid substance on the inclined plates 6 may easily slide down.

Another method is to give vibration to the inclined plates 6 at the right angle to the direction of the alignment thereof so that the settled solid substance on the inclined plates 6 may easily slide down.

A further method is to give upward and downward vibration to the inclined plates 6 vertical to the direction of the alignment thereof so that solid substance may easily slide down. Accordingly, the highest efficiency can be obtained by selecting the most suitable one of the three methods, depending on the nature of the particular slurry being clarified.

Figure 4:
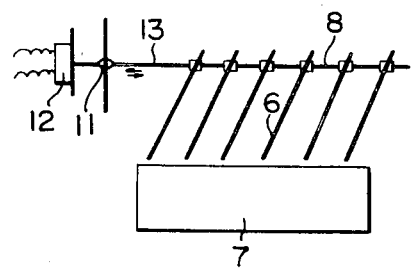
FIG. 4 is the side view illustrated by a further example.

FIG. 4 illustrating a further example is a structure to vibrate the inclined plates 6 horizontally at a right angle to the direction of the flow of liquid to be treated by connecting the stem 8 unifying the inclined plates 6 in a body directly with the rod 13.

Figure 5:
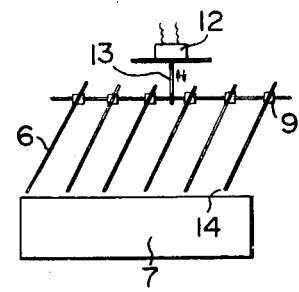
FIG. 5 is the side view illustrated by a still further example.

FIG. 5 illustrating a still further example shows vibrating the inclined plates 6 vertically, i.e. upwardly and downwardly alternatively.

In the above-mentioned examples, the inclined plates 6 and the partition plates 7 are separately vibrated as two quite different bodies by the medium of the contacting phase 14. However, the inclined plates 6 and the partition plates 7 welded or bolted together in one body may also be vibrated at the same time.

According to the present invention, the remaining time of slurry in the settler can be reduced from 120 on average to only 10 minutes, i.e. one-twelfth. Solid liquid separation for liquid to be treated can be operated by means of the inclined plates 6 provided in the settler, the concentration of particle solid substance can also be operated by means of the partition plates 7 provided below the inclined plates and the compact settler can be built in an extremely small size.

One feature of the present invention has the advantage that the function of solid-liquid separation and that of concentration of particle solid substance can be maintained because solid settled on the inclined plates 6 will not stick or remain thereon because of the vibration thereof.

Another feature of the present invention has the advantage that sticking of particle solid substance to the partition plates 7 can be prevented during the process of concentration by giving vibration to the partition plates.

Conventional settlers have a disadvantage that the dimension of thickeners are required to be varied in accordance with the capacity of the settler.

Nevertheless, a still further feature of the present invention has the advantage that in accordance with the capacity of treatment, necessary number of units of the compact thickener, such as five units, ten units or twenty units, can be arranged in series and moreover in spite of the capacity for treatment of each the uniform effect can be obtained for settlement, concentration, the influence by the flow of liquid is prevented, and the sticking particle solid substance to the inclined plates 6 and the partition plates 7 is prevented by means of giving vibration.

I claim:
1. A settler comprising in combination:
    a solid-liquid separation chamber having at the upper portion thereof a liquid inlet on one side of said chamber and a liquid outlet on the other side of said chamber defining a direction of flow therebetween;
    a particle solid substance settlement means in the lower portion of said chamber;
    a solid-liquid separation device within said separation chamber, comprising a plurality of parallel plates having upper and lower transverse edges and first and second lateral edges, said parallel plates being aligned with said upper and lower tranverse edges substantially parallel to the direction of flow between said liquid inlet and said liquid outlet, said parallel plates having said first lateral edges thereof facing the side of said separation chamber in which is located said liquid inlet and said second lateral edges thereof facing the side of said separation chamber in which is located said liquid outlet, and said parallel plates being inclined from the vertical and being mechanically interconnected by a means for maintaining the position of said parallel plates relative to each other;

a baffle plate disposed in the upper portion of said separation chamber between said liquid inlet and said first lateral edges of said parallel plates, said baffle plate being disposed substantially at right angles to the planes of said parallel plates, a particle solid substance concentration device comprising a plurality of partition plates disposed below said lower transverse edges of said parallel plates, said partition plates being parallel to each other and aligned at substantially right angles to the alignment of said parallel plates, said partition plates being mechanically interconnected by a means for maintaining the position of said partition plates relative to each other;

first vibration means for vibrating the parallel plates of said solid-liquid separation device; and second vibration means for vibrating the partition plates of said particle solid substance concentration device.

2. The device of claim 1, further comprising means to vibrate simultaneously both said parallel plates and said partition plates tightly unified in one body.

* * * * *

UNITED STATES PATENT OFFICE
CERTIFICATE OF CORRECTION

PATENT NO. : 3,903,000
DATED : September 2, 1975
INVENTOR(S) : Mitugi MIURA et al It is certified that error appears in the above-identified patent and that said Letters Patent are hereby corrected as shown below:

[30] Foreign Application Priority Data
    December 28, 1972 Japan ...... 48-130169

Column 1, line 27, insert --has-- before "to be"

Column 2, line 46, insert --for-- before "exhausting"

Column 3, line 7, insert --through-- after "quantity"

Signed and Sealed this tenth Day of February 1976

[SEAL]

Attest:

RUTH C. MASON
Attesting Officer

C. MARSHALL DANN
Commissioner of Patents and Trademarks